US012720175B2

(12) United States Patent
Rubin

(10) Patent No.: US 12,720,175 B2
(45) Date of Patent: Aug. 25, 2026

(54) BROADBAND CAMERA FOR FLAME DETECTION AND DETECTION OF A THERMAL IMAGE OF THE SCENE OF THE FLAME

(71) Applicant: LightPath Technologies, Inc., Orlando, FL (US)

(72) Inventor: Shmuel Rubin, Winter Park, FL (US)

(73) Assignee: LIGHTPATH TECHNOLOGIES, INC., Orlando, FL (US)

(*) Notice: Subject to any disclaimer, the term of this patent is extended or adjusted under 35 U.S.C. 154(b) by 70 days.

(21) Appl. No.: 18/676,923

(22) Filed: May 29, 2024

(65) Prior Publication Data

US 2024/0406523 A1 Dec. 5, 2024

Related U.S. Application Data

(60) Provisional application No. 63/599,005, filed on Nov. 15, 2023, provisional application No. 63/469,626, filed on May 30, 2023.

(51) Int. Cl.

| | |
|---|---|
| ***H04N 23/23*** | (2023.01) |
| ***H04N 23/12*** | (2023.01) |
| ***H04N 23/52*** | (2023.01) |
| ***H04N 23/55*** | (2023.01) |

(52) U.S. Cl.

CPC ............. *H04N 23/23* (2023.01); *H04N 23/12* (2023.01); *H04N 23/52* (2023.01); *H04N 23/55* (2023.01)

(58) Field of Classification Search

CPC ........ H04N 23/23; H04N 23/12; H04N 23/52; H04N 23/55; G01J 3/0235; G01J 2003/2806; G01J 2003/2826; G01J 3/2823; G01J 5/05; G01J 2005/202; G01J 5/20; G01J 5/0865; G01J 2005/0077; G01J 5/0802; G01J 5/0018; G08B 17/12

See application file for complete search history.

(56) References Cited

U.S. PATENT DOCUMENTS

| | | | | |
|---|---|---|---|---|
| 5,677,532 | A * | 10/1997 | Duncan | G01J 5/0014 250/330 |
| 7,687,776 | B2 * | 3/2010 | Baliga | G01J 3/443 250/338.5 |
| 7,965,336 | B2 * | 6/2011 | Bingle | B60S 1/0411 348/149 |
| 9,651,254 | B2 | 5/2017 | Ducharme et al. | |
| 2008/0251724 | A1 * | 10/2008 | Baliga | G01J 3/02 250/338.5 |

(Continued)

FOREIGN PATENT DOCUMENTS

| | | |
|---|---|---|
| CN | 216954851 U | 7/2022 |
| WO | 2023278617 A2 | 1/2023 |

OTHER PUBLICATIONS

International Preliminary Report on Patentability issued Dec. 11, 2025, in corresponding International Application No. PCT/US2024/031352, 12pp.

*Primary Examiner* — Padma Haliyur

(74) *Attorney, Agent, or Firm* — XSENSUS LLP

(57) ABSTRACT

An infrared imaging system includes a detector configured to detect a flame in a first infrared wavelength band and to detect a thermal image in a second infrared wavelength band, longer than the first infrared wavelength band; and an imaging circuit configured to output an image including the flame and the thermal image.

15 Claims, 4 Drawing Sheets

(56) References Cited

U.S. PATENT DOCUMENTS

| | | | | |
|---|---|---|---|---|
| 2013/0228692 | A1* | 9/2013 | Larsen | G01J 3/021 250/342 |
| 2016/0200264 | A1 | 7/2016 | Bingle et al. | |
| 2017/0142351 | A1* | 5/2017 | Cole | G01J 3/36 |
| 2018/0066992 | A1 | 3/2018 | Au et al. | |
| 2018/0188163 | A1* | 7/2018 | Kester | G01N 33/0047 |
| 2019/0187000 | A1* | 6/2019 | Gamfeldt | G01J 5/0802 |
| 2020/0011789 | A1* | 1/2020 | Sandsten | G01N 21/3504 |
| 2020/0348446 | A1* | 11/2020 | Tremsin | G01V 8/005 |
| 2022/0229033 | A1* | 7/2022 | Kester | G01J 5/0814 |
| 2024/0021059 | A1* | 1/2024 | Pilla | G01J 5/0018 |

* cited by examiner

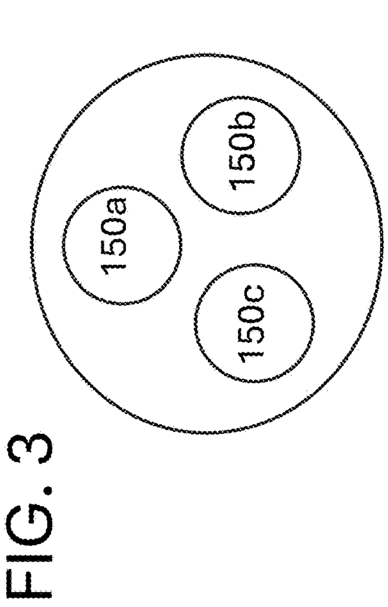
FIG. 3
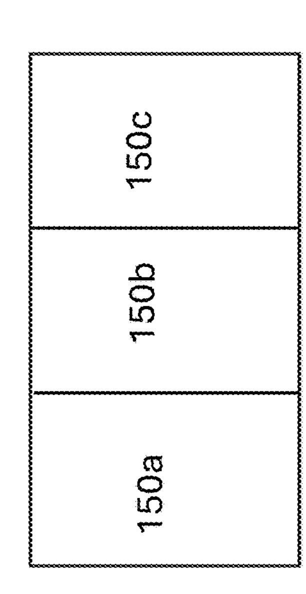
FIG. 4
FIG. 5A
FIG. 5B
FIG. 5C

BROADBAND CAMERA FOR FLAME DETECTION AND DETECTION OF A THERMAL IMAGE OF THE SCENE OF THE FLAME

CROSS-REFERENCE TO RELATED APPLICATIONS

The present application claims priority to Provisional Ser. No. 63/599,005 filed on Nov. 15, 2023, and 63/469,626 filed on May 30, 2023, the entire contents of both of which are incorporated herein by reference.

BACKGROUND

Field

The present disclosure relates to imaging in using a broadband camera to both detect a flame and a thermal image of a scene of the flame.

Description of the Related Art

Mid infrared detectors that filter out all wavelengths and specifically detect only the 4.3-4.4 um range for flame detection are currently in use. Additionally, some detectors also include additional detection features such as identifying flickering frequency of the detected flame or supplementing with additional detectors such as color detectors or cameras to confirm the presence of a flame. Further, long wave infrared cameras have long been used to detect human or animal presence.

SUMMARY

One or more embodiments is directed to an infrared imaging system, including a detector configured to detect a flame in a first infrared wavelength band and to detect a thermal image in a second infrared wavelength band, longer than the first infrared wavelength band; and an imaging circuit configured to output an image including the flame and the thermal image.

BRIEF DESCRIPTION OF THE DRAWINGS

FIG. 3 illustrates another configuration for multiple filters.

FIG. 4 illustrates still another configuration for multiple filters.

FIGS. 5A and 5B are images generated by the multispectral infrared camera with a first filter and a second filter.

FIG. 5C is a composite image generated by combining the images of FIGS. 5A and 5B.

The scope of the present disclosure is best understood from the following detailed description of exemplary embodiments when read in conjunction with the accompanying drawings.

DETAILED DESCRIPTION

Embodiments are directed to leveraging the broadband sensitivity of a broadband infrared cameras, e.g., a camera including an uncooled bolometer sold by LightPath Technologies®, e.g., the Multispectral Infrared Camera MANTIS™, and using at least two filters, allowing the camera can be used for both flame detection and imaging a scene around the flame. These filters may be placed anywhere within the optical system, e.g., in front of the detector. Additionally, the frequency of the flickering of the suspected flame may be measured as another validation point. Further, detectors capturing signals at other wavelengths, e.g., 3 um and 5 um, to eliminate a false positive result from a broadband source such that will have a signal at both the flame wavelength as well as other wavelengths may be employed.

Additionally, a thermal camera based on measurement of temperature can easily confuse hot equipment that is used in a production environment, for a fire. The inventors have recognized that the flame imaged at 4.3 um is actually the hot $CO_2$ being emitted that resonates at that wavelength. Also, the $CO_2$ in the air that is not hot absorbs at that wavelength, limiting possible false alarms from sunlight. However, this also causes some limitations in the ability to detect the 4.3 um flame from a great distance.

Figure 1:
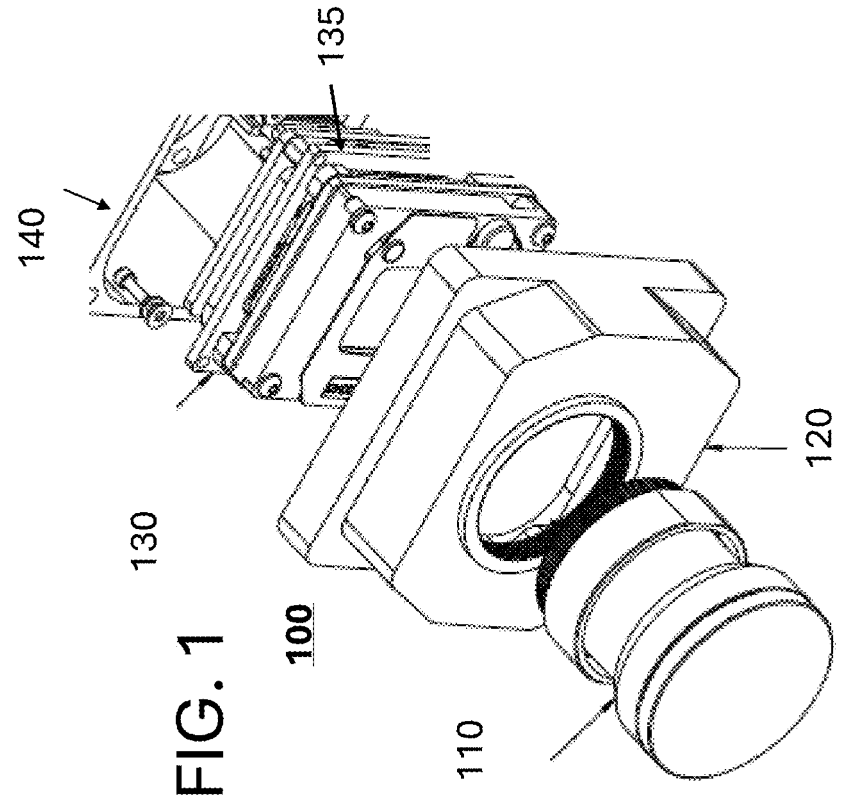
FIG. 1 illustrates an exploded side view of a multispectral infrared camera.

FIG. 1 is an exploded perspective view of a broadband camera 100. The camera 100 generally includes an imaging assembly 110, a mount 120 coupling the imaging assembly to a detector 130, and a circuit 135 all of which may be provided in a housing 140. The circuit 135 is configured to readout from the detector 130 and preform image processing and control processing for the camera 100. Alternatively, the circuit 135 may just readout from the detector and transmit the readout to a memory and a processor for further processing. The camera 100 also includes filters 150*a*, 150*b* to be controllably provided in front of the detector 130 using a drive circuit 160. The drive circuit 160 may be controlled by the circuit 135 or the external processor, or may move the filters based on a predetermined pattern. For example, any of the filters shown in FIGS. 2 to 4 may be placed in front of the detector or the lens, and the frequency of the spin may be synchronized with the camera's frame rate so that each frame sequentially has a different filter in front of it. For example, detector 130 operating at 60 frames per second, and the filter being moved pinning such that every odd frame has a flame detection filter in front of it, and every even frame has the LWIR filter in front of it. By synchronizing the filter wheel one can generate two video streams, flame detection and LWIR.

Figure 2:
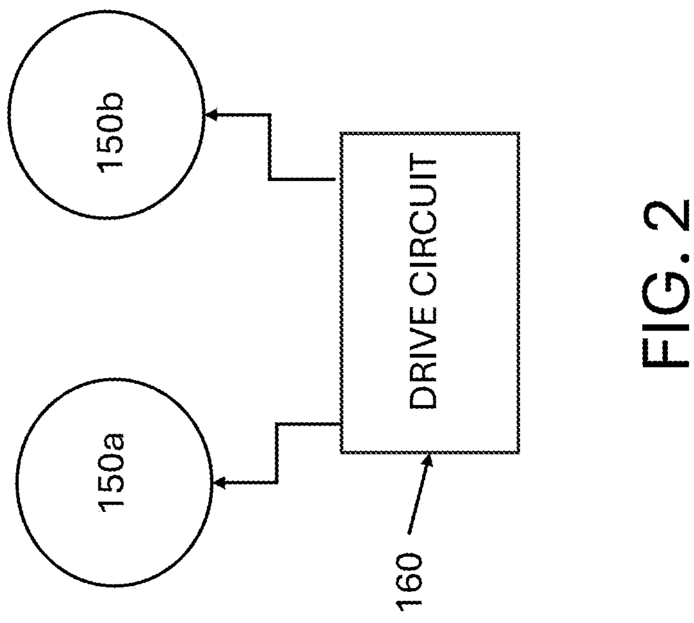
FIG. 2 illustrates an embodiment of interchangeable filters to be provided in the multispectral infrared camera.

These filters 150*a*, 150*b* may be discrete filters as shown in FIG. 2 or may be formed on a single element 152 that can be rotated, as shown in FIG. 3, or a single element 154 that can be translated, as shown in FIG. 4, into and out of the light path of the detector 130. Additionally, as shown in FIGS. 3 and 4, there may be more than two filters, e.g., filters 150*a* to 150*c*, e.g., another filter for a control wavelength.

The filter 150*a* may be a bandpass filter that transmits both wavelengths of the flame, e.g., 4-4.5 μm, and wavelengths output by warm-blooded creatures or other elements in the scene that radiate within this wavelength region, e.g., 8-12 μm. As can be seen in FIG. 5A, while this allows both objects to be imaged, the flame cannot readily be distinguished from the heat. Once a confirmation circuit determines that an intensity of light in the flame region generated by the heat source exceeds a threshold, the drive circuit 160 replaces the filter 150*a* with the filter 150*b*. The filter 150*b* is a flame filter, e.g., only transmits in the flame wavelength e.g., 4-4.5 μm. As can be seen in FIG. 5B, this allows the flame to be clearly distinguished from the heat itself, while the person is no longer visible. Then, as shown in FIG. 5C, the two image may be combined to clearly show in person and the flame. Alternatively, the flame filter 150*b* may be in front of the camera and, once a flame is detected, the filter may be switched to detect an image of the scene.

Figures 6, 7, 8, 9:
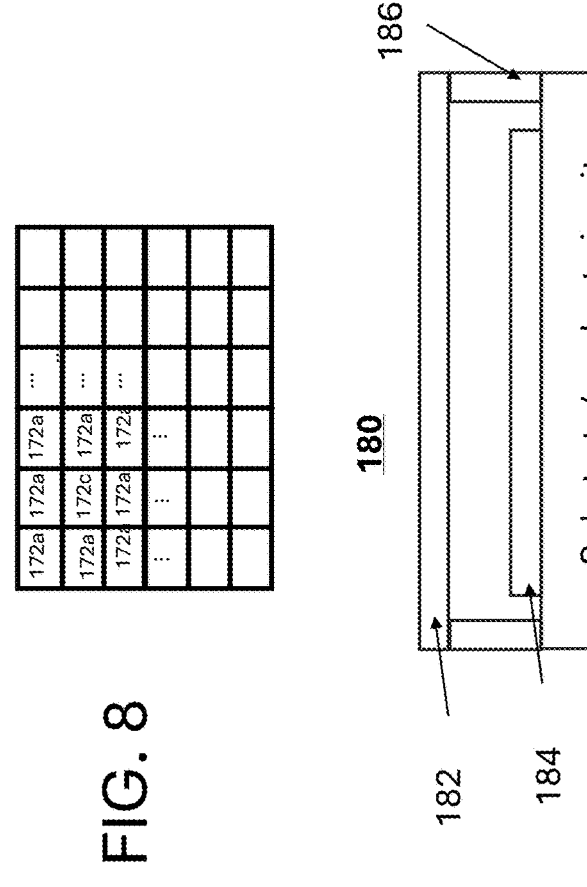
FIG. 6 illustrates a filter mask to be used in the multispectral infrared camera.
FIG. 7 illustrates another filter mask to be used in the multispectral infrared camera.
FIG. 8 illustrates another filter mask to be used in the multispectral infrared camera.
FIG. 9 illustrates a cross-sectional view of a bolometric detector.

In another embodiment, instead of moving filters in and out the path of the detector 150, a filter mask 170, shown in FIG. 6, may be placed in front of the detector 130, in which white components 172*a* transmit the flame wavelengths in the MWIR and shaded components transmit 172*b* in the LWIR. While this may simplify the structure, this will reduce the resolution of the camera 100.

In another embodiment, the third filter 150*c* may be a control filter that transmits wavelengths near the flame wavelength, but at which the flame has a much lower emission, e.g., 5 μm, to serve as a control to verify the image is indeed a flame and not a broadband source. Alternatively, control components 172*c* may be substituted as some of the first components 172*a* of the filter mask 170, as high resolution of the control image is not needed. Further, as shown in FIG. 6, a filter mask 170A may have filter components that are further subdivided, in which a control sub-component 172*c* may be provided along with sub-components 172*a*. Additionally, if to be used as the filter 150*b* or in a configuration in which another camera is used to image the LWIR, a filter mask 170B as shown in FIG. 7 may be used to just image the flame. As a further modification, a photodiode with optics covering the same, or similar field of view as the uncooled infrared camera, but that detects the control wavelength, e.g., 5 um, or has a filter thereon that only transmits in this region, the signal from the photodiode may be used to eliminate false positive due to a broadband source such as sunlight or other broadband sources. Thresholds for this determination may be calibrated for the photodiode.

The detector 130 may be a microbolometer 180. FIG. 9 illustrates a simplified cross-sectional view of an elementary bolometric detector 180 including a IR absorbing membrane 182 mounted above a reflector 184 by supports 186 that suspend the membrane above the reflector and electrically connect the output of the membrane to a substrate/read out circuit 188. A gap between the membrane 182 and the reflector 184 below the membrane 182 may be optimized for detecting 4.3 um. Alternatively, the reflector 184 may include a coating, e.g., a phosphor coating or wavelength conversion coating such as Raman shifting coating, that absorbs light at 4.3 μm and emits light at a wavelength the microbolometer can better detect, e.g., long wave infrared. The detector 130 may be high definition, standard definition, or low resolution.

Figure 10:
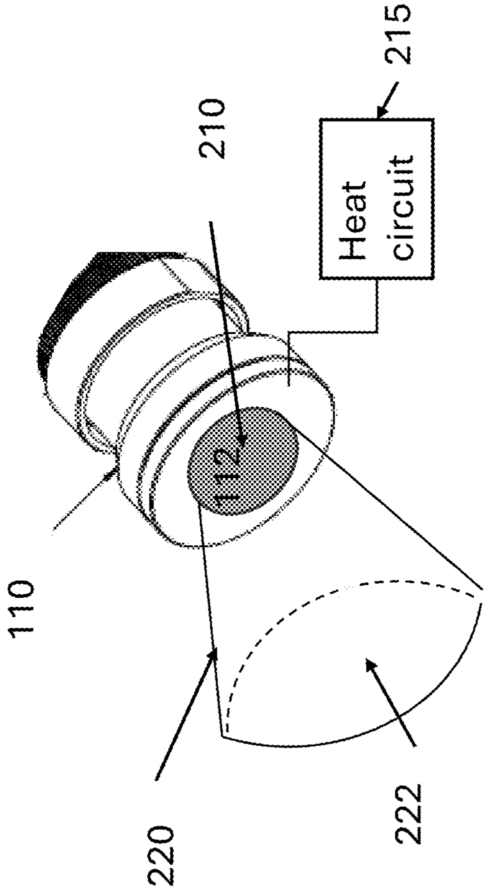
FIG. 10 illustrates a side view of an imaging assembly with water mitigation solutions.

One potential issue with the accuracy and detection is that water absorbs 4.3 um. Thus, any water that is on the front lens or front window of the camera negatively impacts the detector. Mitigation solutions for the presence of water are illustrated in FIG. 10. First, a coating 210, e.g., a hydrophobic, super hydrophobic or hydrophilic coating, may be provided the front surface of a front optical component 1, e.g., a lens or window, of the imaging assembly to reduce the existence of water on that front optic. Additionally or alternatively, the coating 210 on the front element of the imaging assembly that can be heated. Additionally or alternatively a front element front element 112 may be formed of a conductive material, e.g., a low resistivity germanium, and a heat circuit 215 configured to inject current through either or both of them to heat them and either defrost any snow or ice on the front element front element 112 or cause any water on the front surface to evaporate, eliminating obstruction to the detection from the water, ice or snow. Additionally or alternatively, the entire imaging assembly 110 may be heated to prevent icing or snow, and to cause any water on the front surface and on any optical surface to evaporate.

Additionally or alternatively a cover 220 may be provided around the front element 112. The cover 220 may have a shape that does not obstruct the field of view, but reduces the likelihood of rain drops or other precipitation directly hitting the front element 112, e.g., a truncated cone. An interior of the cone 220 may include a reflective material 222 for directing light at wavelengths to be detected onto the front element 112.

While the above description has been made regarding detection of a thermal image of objects in the scene other than the flame, the thermal image in the longer wavelength region may also be used to further evaluate the flame itself.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure. The scope of the invention is indicated by the appended claims, rather than the foregoing description.

The invention claimed is:

1. An infrared imaging system, comprising:

a detector configured to detect a flame in a first infrared wavelength band and to detect a thermal image in a second infrared wavelength band, longer than the first infrared wavelength band, wherein the detector is further configured to detect a third infrared wavelength band in a mid-range wavelength band in which a flame is less intense than in the first infrared wavelength band;

a pattern of first filter components to transmit the first infrared wavelength band, second filter components to transmit the second infrared wavelength band, and third filter components to transmit the third infrared wavelength band, wherein a number of third filter components is less than a number of first filter components or a number of second filter components, an imaging circuit configured to output an image including the flame and the thermal image; and a confirmation circuit configured to determine that detection of a flame is a false positive in response to an intensity of the light at the third infrared wavelength band being greater than a threshold.

2. The infrared imaging system of claim 1, further comprising:
a drive circuit configured to alternately position the first filter in an optical path of the detector and the second filter in the optical path of the detector.

3. The infrared imaging system of claim 2,
wherein the drive circuit is configured to alternately position the first to third filters in an optical path of the detector and the second filter in the optical path of the detector.

4. The infrared imaging system of claim 3, wherein the drive circuit is configured to position the third filter in the optical path in response to a flame being detected.

5. The infrared imaging system of claim 1, wherein a number of first filter components and a number of second filter components are the same.

6. The infrared imaging system of claim 1, wherein the detector includes a first camera to detect the flame and a second camera to detect the thermal image.

7. The infrared imaging system of claim 1, wherein the detector includes a photodiode to detect the third infrared wavelength band that serves as the third filter component.

8. The infrared imaging system of claim 1, further comprising an imaging assembly to direct light onto the detector.

9. The infrared imaging system of claim 8, wherein a first optical surface of the imaging assembly is made of a conductive material and a heater to heat the conductive material.

10. The infrared imaging system of claim 8, wherein the imaging assembly includes a front element configured to be heated.

11. The infrared imaging system of claim 8, wherein a first optical surface of the imaging assembly includes a hydrophobic coating.

12. The infrared imaging system of claim 8, further comprising a cover in front of a first optical surface of the imaging assembly that shields the first optical surface and does not obstruct the field of view.

13. The infrared imaging system of claim 12, wherein an inner surface of the cover is reflective.

14. The infrared imaging system of claim 2, wherein the drive circuit is configured to alternately position the first filter in an optical path of the detector and the second filter in the optical path of the detector synchronized with a frame rate of the detector.

15. An infrared imaging system, comprising:
a detector configured to detect a flame in a first infrared wavelength band and to detect a thermal image in a second infrared wavelength band, longer than the first infrared wavelength band, wherein the detector is further configured to detect a third infrared wavelength band in a mid-range wavelength band in which a flame is less intense than in the first infrared wavelength band;
a filter mask including a pattern of first filter components to transmit the first infrared wavelength band, second filter components to transmit the second infrared wavelength band, and third filter components to transmit the third infrared wavelength band, wherein a number of third filter components are less than a number of first filter components or a number of second filter components; and
an imaging circuit configured to output an image including the flame and the thermal image.

* * * * *